United States Patent [19]

Holland et al.

[11] Patent Number: 5,673,307

[45] Date of Patent: Sep. 30, 1997

[54] HANDOFF METHOD FOR INDOOR CELLULAR PHONE SYSTEM

[75] Inventors: Bruce M. Holland, Boulder; Gary L. Bliss, Westminster; Bryan Edwards, Boulder, all of Colo.

[73] Assignee: SpectraLink Corporation, Boulder, Colo.

[21] Appl. No.: 198,943

[22] Filed: Feb. 17, 1994

[51] Int. Cl.⁶ .................... H04Q 7/22; H04Q 7/38
[52] U.S. Cl. .................... 379/60; 455/33.1; 455/33.2
[58] Field of Search .................... 370/95.1, 95.3; 375/205; 379/58, 59, 60, 63; 455/12.7, 19, 31.1, 33.1, 33.2, 33.4, 34.1, 53.1, 54.1, 54.2, 56.1, 67.1, 73

[56] References Cited

U.S. PATENT DOCUMENTS

| | | | |
|---|---|---|---|
| 4,268,722 | 5/1981 | Little et al. | |
| 4,670,899 | 6/1987 | Brody et al. | 379/60 |
| 4,803,726 | 2/1989 | Levine et al. | 380/48 |
| 5,042,082 | 8/1991 | Dahlin | 455/33.2 |
| 5,081,572 | 1/1992 | Arnold | 395/375 |
| 5,101,501 | 3/1992 | Gilhousen et al. | 455/33.2 |
| 5,157,661 | 10/1992 | Kanai et al. | 370/95.1 |
| 5,175,867 | 12/1992 | Weike et al. | 455/33.1 |
| 5,179,571 | 1/1993 | Schilling | 375/1 |
| 5,200,957 | 4/1993 | Dahlin | 370/100.1 |
| 5,203,010 | 4/1993 | Felix et al. | 455/33.2 |
| 5,243,598 | 9/1993 | Lee | 370/95.3 |
| 5,303,289 | 4/1994 | Quinn | 379/60 |
| 5,305,466 | 4/1994 | Taketsugu | 455/33.1 |
| 5,329,635 | 7/1994 | Wadin et al. | 455/33.2 |
| 5,345,467 | 9/1994 | Lomp et al. | 375/205 |
| 5,392,453 | 2/1995 | Gudmundson et al. | 455/33.2 |
| 5,450,473 | 9/1995 | Shiotsuki et al. | 379/60 |

FOREIGN PATENT DOCUMENTS

| | | | |
|---|---|---|---|
| 0652003 | 7/1992 | Australia | 455/33.2 |
| 0471656 | 2/1992 | European Pat. Off. | 379/60 |

OTHER PUBLICATIONS

"A Model for Analyzing Handoff Algorithms", Vijayan, Holtzman, IEEE Transactions on Vehicular Technology, vol. 42, No. 3, Aug. 1993.

Kanaj, Taketsugu, Kondo, "Experimental Digital Cellular System for Microcellular Handoff", IEEE 1990.

*Primary Examiner*—William Cumming
*Attorney, Agent, or Firm*—Dorr, Carson Sloan & Birney, P.C.

[57] ABSTRACT

A method, system, and apparatus for communication and handoff in a cellular phone system in which candidate cell units which can support communication with a mobile phone are identified. Neighbor cell units which have recently supported communication with the mobile phone are also identified. Handoff threshold values for each candidate cell are determined based on the existing communication quality and whether the candidate cell is also a neighbor cell such that the handoff threshold is higher when the candidate cell is a neighbor cell. A decision to handoff is made when the improvement offered by candidate cell is greater than the handoff threshold.

8 Claims, 6 Drawing Sheets

Fig. 4
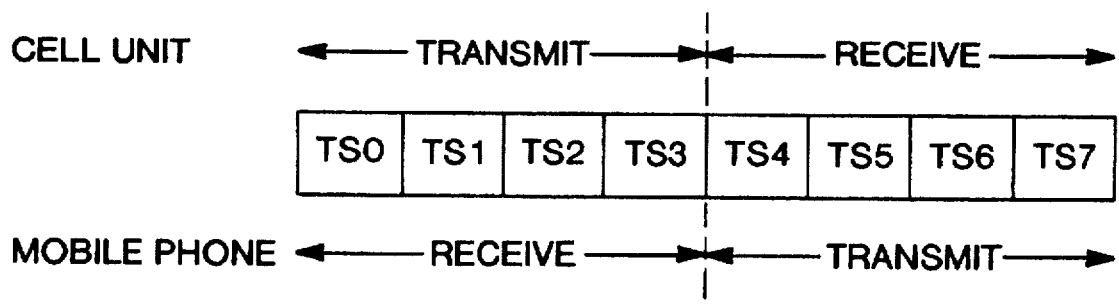
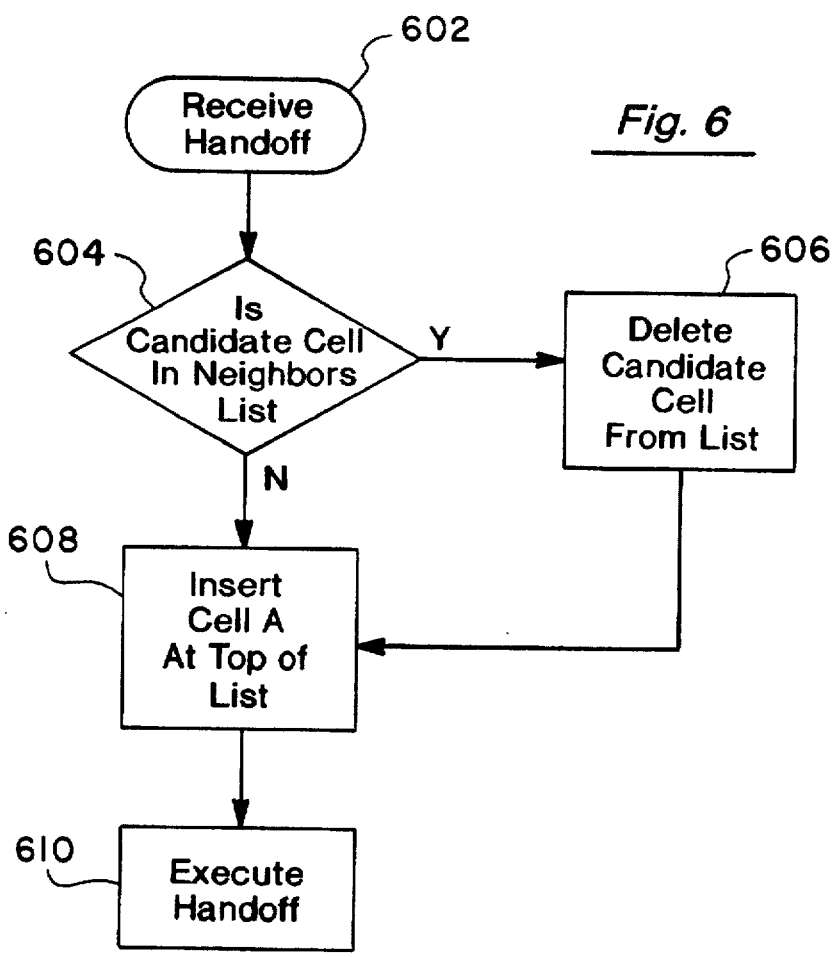
Fig. 6

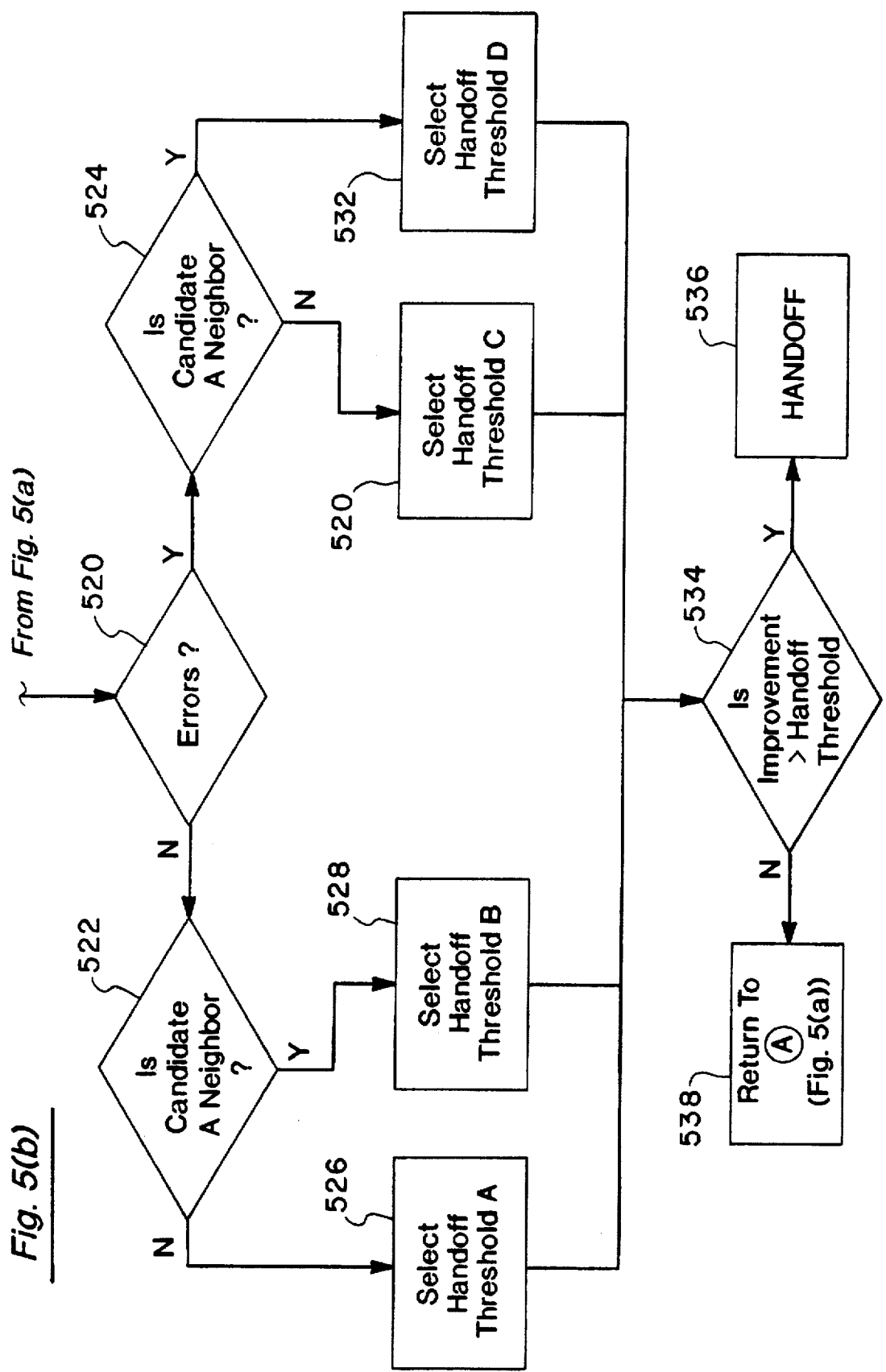

HANDOFF METHOD FOR INDOOR CELLULAR PHONE SYSTEM

BACKGROUND OF THE INVENTION

The present invention relates in general, to cellular phone systems, and more particularly, to a handoff method allowing rapid handoff when required and avoiding premature or "ping-pong" handoff in an indoor cellular environment.

1. Statement of the Problem

Cellular phone systems are made up of a plurality of spacially distributed "cell units" which are essentially radio transmitters and receivers. The space surrounding each cell unit in which the cell unit's signal strength is sufficiently strong in relation to noise and interfering signals is called a "cell." Each cell unit transmits and receives on a given set of frequencies and communicates with a mobile telephone while the mobile phone is located within the cell boundaries.

Each cell unit is coupled to a master control unit which coordinates activities and telephone traffic among the various cell units in the system. The master control unit directs calls to a public telephone network. The mobile phone and the cell unit use a common protocol which defines parameters such as signal format, timing, and operating frequencies to allow communication between the cell unit and the mobile phone.

In order for the cellular system to maintain an established communication link while the mobile phone moves from one cell unit to another, it is fundamental that the system provide a method for handing off the communication link from one cell unit to another. It is also fundamental that the system be able to maintain an existing communication link while the mobile phone remains in a single cell, but the signal strength varies. In practice, almost every handoff causes a certain amount of audio distortion and lost data. Also, frequent handoffs burden the master control unit by increasing the data processing overhead required to set up and take down communication links. The processes by which the communication link is maintained and moved among the cell units are commonly called handoff methods or handover methods. A properly designed handoff method is critical for the overall functioning of a cellular radio system.

Essentially, the handoff method must detect when a mobile phone would be better served by a cell unit other than the cell unit which is currently serving the mobile phone. When this occurs, a decision is made to handoff the conversation from one cell unit to the next by executing a preestablished set of instructions to set up a communication between the mobile phone and the new cell unit and take down the existing communication link between the mobile phone and the original cell unit.

The present invention involves a method of detecting when to execute the handoff instructions, and is applicable to any particular handoff instructions which the cellular phone may use. For example, a particular cell unit's signal strength becomes weaker and communication between the mobile phone and the cell unit begins to deteriorate near that cell's boundary. In a properly designed system, there is some overlap in the coverage of each cell unit so that by the time the signal begins to deteriorate, the mobile is within range of an adjacent cell unit and the communication link can be handed off from one cell unit to the other.

In an outdoor cellular environment, each cell unit covers a large area (i.e., one or more miles) and so the handoff is relatively infrequent. Also, in an outdoor cellular environment the signal strength distribution is relatively "well behaved", that is to say, signal strength deteriorates predictably as the mobile phone moves away from the cell unit and increases predictably as the mobile phone moves towards the next cell unit.

In an outdoor cellular environment there are "shadow regions" within a cell boundary where the signal is weak caused by geographic features, buildings, and a broadcast pattern of the cell unit's antenna. These shadow regions can fool the mobile phone or the cellular phone system into believing that the signal strength has deteriorated and that the mobile phone has left the range of the current cell. However, because if the mobile phone is moving rapidly through the cell, it doesn't remain long in the shadow region. Thus, the handoff method for outdoor cellular systems merely needs to average a signal strength measurement over a long enough time period so that the mobile phone has moved out of the shadow region. This reduces premature handoff, although it remains a weakness with outdoor systems.

The handoff decision is traditionally based on signal strength since this is a good indication of the relative position of the mobile phone with respect to the cells. Another criteria used in digital cellular systems is bit error rate. Signal strength and bit error rate, alone or in combination, are referred to herein as "communication quality" measurements. Using these methods, the mobile phone or the cell unit measures the communication quality of the existing communication link and bases the decision to handoff on these measurements.

For various reasons, in an indoor cellular environment, the handoff decision is best made by the mobile phone itself rather than the cell unit or master control unit. Several existing systems, for example the European DECT system, locate the handoff decision in the mobile phone. Although the indoor cellular environment is generally organized in a similar way (i.e., a plurality of cells each supporting communication links in a predetermined amount of space in the cellular system) the signal strength distribution is much less well behaved than in the outdoor cellular environment. In the indoor environment, cells are placed much closer together and may or may not be uniformly positioned throughout the system. Duct work, plumbing, and wiring inside the building as well as the structure of the building itself create many shadow regions throughout the system. Thus, fading is a more significant problem in the indoor environment.

Also, a cell unit's broadcast range may be unpredictably effected by duct work, piping, or other building features so that a particular cell unit's signal may be very much stronger or weaker than expected at various locations. Thus, the shape and size of a particular cell unit's boundary is difficult to define. These features of the indoor cellular environment create an environment in which the handoff decision is very difficult to make.

Another problem with indoor cellular systems is that, unlike the outdoor system, the handoff decision must be made rapidly. A mobile phone may be relatively stationary for a long time in which a handoff should not occur, but at the same time a mobile phone may be used in an elevator requiring a handoff every few seconds as it travels through the building. Also, indoor cellular systems use very small cells, also called microcells, and so handoffs must occur frequently. In the indoor environment it is more difficult to predict when or to which cell unit the handoff should be made. In the outdoor environment, in contrast, the central system making the handoff decision knows the finite number of cells to which the communication link can be handed off, and has plenty of time to set up the handoff.

Hence, the handoff decision-making process is not only more important in the indoor cellular system, but also more difficult. Prior handoff methods use averaging techniques that were either to slow or too fast for the environment. With a slow averaging method, quality suffered by not handing off to a better cell quickly enough. This is typical of entering an elevator or walking around a corner or other shielding object. With a fast averaging technique, quality suffered when frequent handoffs occurred between a group of cells due to frequent variations of signal strength. These rapid handoffs are referred to a ping-ponging. Ping-pong places a large load on the central controller and causes degradation of the received audio. What is needed is a method for handing off which can be directed by a mobile cellular phone to both rapidly handoff when required and avoid premature ping-pong handoff.

2. Solution to the Problem

These and other problems are solved by a method for handing off a cellular telephone which evaluates quality of the communication link between the mobile phone and the current cell unit, and signal strength between the mobile phone and other cell units which are not currently supporting a communication link with the mobile phone. The method identifies the strongest of the cell units as candidates for handing off. The method of the present invention also identifies cells which have recently supported communication with the mobile phone.

A handoff threshold is selected for each candidate cell unit which quantifies the amount of improvement that candidate cell unit must provide over the existing cell unit in order for a handoff to be allowed. The handoff threshold selection is based upon 1) current communication quality between the mobile phone and the current cell; 2) anticipated communication quality between the mobile phone and one of several candidate cells; and 3) whether or not the mobile phone has recently communicated with the candidate cell. By balancing these multiple factors, a rapid handoff decision can be made while avoiding premature handoff and ping-pong handoff. Because handoffs are reduced, audio quality of the phone connection is improved and demands on the central control system are reduced.

SUMMARY OF THE INVENTION

The present invention provides a method for handing off a communication link with a mobile phone from a first cell unit to a second cell unit including the steps of creating a neighbors list comprising cell units that have recently supported a communication link with the mobile phone and creating a candidates list comprising cell units which are capable of supporting a communication link with the mobile phone. Existing communication quality is measured. Communication quality between each of the cell units on the candidates list and the mobile phone is also measured.

A handoff threshold value is selected for each cell unit on the candidates list based upon contents of the candidates list, contents of the neighbors list, and the existing communication quality measurement. The handoff threshold determines the amount of signal strength improvement required to allow a handoff from the first cell unit to one of the candidate cell units. A handoff command is generated only when a cell unit on the candidates list has a communication quality improvement greater than the handoff threshold for that cell unit. The second cell unit is removed from the candidates list and the first cell unit is added to the neighbors list.

Another aspect of the present invention is a cellular phone system that implements a handoff method in accordance with the present invention. Yet another aspect of the present invention is a mobile phone having internal components for transmitting and receiving on a number of communication channels used by the cellular phone system. The mobile phone includes adjustable means for demodulating each of the communication channels individually and providing a demodulated signal. A first means for measuring instantaneous signal strength of the demodulated signal and a second means for measuring data error rate of the demodulated signal are provided in the mobile phone.

The mobile phone includes a candidate register for storing identities of cell units having sufficient instantaneous signal strength to support the communication link with the mobile phone and a neighbor register for storing identities of cell units which have recently supported the communication link with the mobile phone. The mobile phone also includes a control circuit that receives signal strength and bit error rate data and provides cell unit identities to the candidate register and neighbors register.

BRIEF DESCRIPTION OF THE DRAWING

FIG. 4 illustrates a time division multiple access format useful in accordance with the present invention;

FIG. 6 illustrates a flow diagram for maintaining a neighbors list in accordance with the present invention.

DETAILED DESCRIPTION OF THE DRAWINGS

1. Overview

Figure 1:
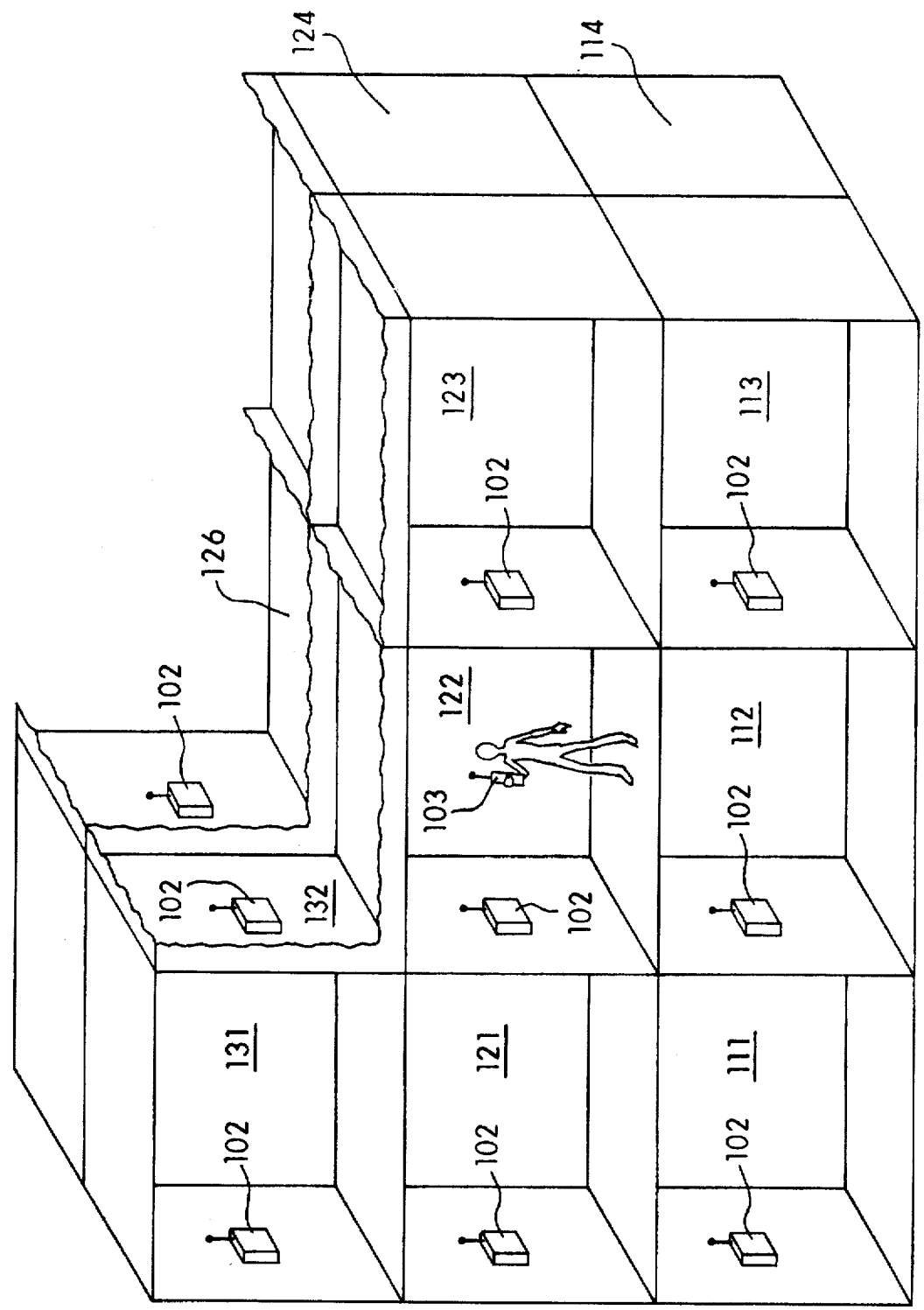
FIG. 1 illustrates a simplified indoor cellular telephone environment.

FIG. 1 illustrates a highly simplified digital indoor cellular system installed in an office building. By digital it is meant that the audio and control signals passing between the mobile phone and the cell units are digitally encoded. In a particular example, the method of the present invention is implemented in a digital cellular system using time division multiple access (TDMA) or time division duplex (TDD) encoding.

For ease of illustration and understanding, each of the offices in FIG. 1 is of uniform size and shape and are distributed uniformly throughout the building. Also, FIG. 1 does not illustrate plumbing, duct work, wiring, and the like which significantly effect the indoor environment. In other words, the office building illustrated in FIG. 1 greatly simplifies the indoor cellular environment.

A key feature of the indoor environment is that mobile telephone 103 is served by any of a number of cell units 102. The particular cell unit that is servicing mobile phone 103 at any given time is determined so as to maximize the overall audio quality provided by the communication link mobile telephone 103. This contrasts with prior handoff methods which seek to maximize instantaneous or short term quality of the communication link itself.

Unlike an outdoor cellular system, cell units 102 are distributed spacially in three dimensions. Also, cell units are relatively close together so that mobile phone 103 can potentially be served by a cell unit 102 located, for example, in office 122, office 123, office 121 or office 112, office 126 or another more distant cell unit. When the effects of plumbing, wiring, and other common features in an office building are considered, it is apparent that it is extremely difficult to predict which of cells 102 will provide the best service to mobile phone 103.

An important feature of the present invention is providing a handoff method whereby mobile phone 103 selects which of the many cells 102 with which to maintain the communication link. Because mobile phone 103 may be constantly moving and the cell unit spacing is so close, mobile phone 103 will often move between several cells 102 during any given conversation. Hence, it is important that the handoff method allow rapid handoff when required to allow adequate mobility for mobile phone 103 while at the same time avoiding premature handoff which creates audio distortion and increases the traffic control overhead required for the mobile phone system.

Figure 2:
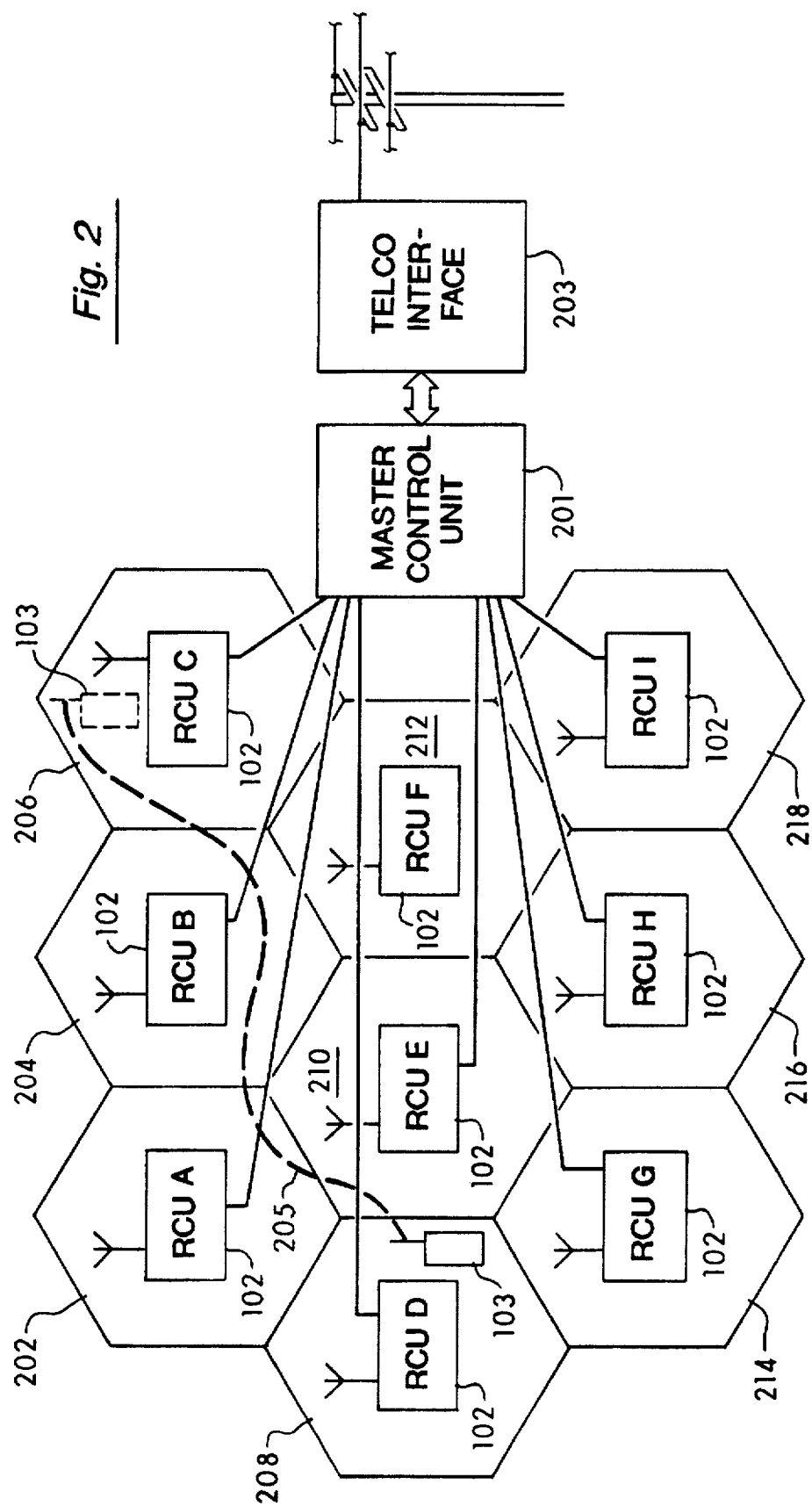
FIG. 2 illustrates in block diagram form basic elements of an indoor cellular telephone environment.

FIG. 2 illustrates a schematic block diagram of the indoor cellular system in accordance with the present invention. Multiple mobile phones 103 are present in each system. For example, up to several hundred may be present in a given cellular system. Also, multiple remote cell units 102 (RCU A through RCU I in FIG. 2) are spacially distributed throughout the system. Each of the RCU's 102 is coupled to a single master control unit 201. Master control unit 201 synchronizes the activities of the many remote cell units 102 and provides various other services which are not a part of the present invention. Master control unit 201 is coupled to a telephone company interface 203, labeled TELCO INTERFACE in FIG. 2, which is substantially similar to a conventional private branch exchange (PBX). The telephone company interface 203 provides access to conventional telephone company services.

An important feature of the present invention is that the handoff method is initiated by mobile phone 103 itself. Unlike conventional telephone cellular systems in which the master control unit 201 would initiate handoff, mobile phones 103 must select which of cell units A–I provide the best service. Throughout the conversation mobile phone 103 must monitor the current connection as well as decide when to switch from the current RCU 102 to another RCU 102.

For example, in FIG. 2 mobile phone 103 may be currently served by RCU D but during the conversation travel along travel path 205 (shown by a bold, dashed line in FIG. 2) to cell 206 served by RCU C. During that conversation, travel path 205 takes mobile phone 103 through cells 210, 202, 204 and 206. Also, travel path 205 comes very close to the border between cell 204 and cell 212. Thus, many handoffs will be required to maintain the conversation.

In FIG. 2 each RCU 102 is surrounded by a hexagonal cell boundary such as 202, 204, 206, 208, 210, 212, 214, 216, and 218. The hexagonal cell boundaries are chosen for convenience and ease of illustration, but it should be understood that in an indoor cellular environment the cell boundary is highly non-uniform and that there is a wide zone between each of the cell boundaries where each of the remote cell units can provide adequate service. Also, within each cell boundary there are shadow regions where signal strength is weak or fades which are not shown in FIG. 2. In other words, for any given travel path 205 more or fewer cell boundaries may be crossed.

Even though mobile phone 103 monitors quality of the communication link, it is difficult to determine when a cell boundary has been crossed or to predict which cell units are nearby. Mobile phone 103 can, however, discern which RCU 102 provides adequate signal strength to support a conversation at any given instant in time. Mobile phone 103 can also measure the error rate of data received from any RCU 102. In accordance with the present invention, signal strength and bit error rate are used by mobile phone 103 to determine when a handoff is required.

In summary, the digital indoor cellular system in accordance with the present invention includes a number of spacially distributed cell units 102 which support communication links within a cell boundary. A mobile phone 103 travels through the system crossing any number of cell boundaries in a given conversation. When a cell boundary is crossed, mobile phone 103 directs the cellular system to handoff the communication link from one remote cell unit 102 to another to maintain a high audio quality conversation between the mobile phone and the cell unit. The details of the mobile phone receiver system which allow this accurate handoff are described in greater detail hereinbelow.

2. Receiver System

Figure 3:
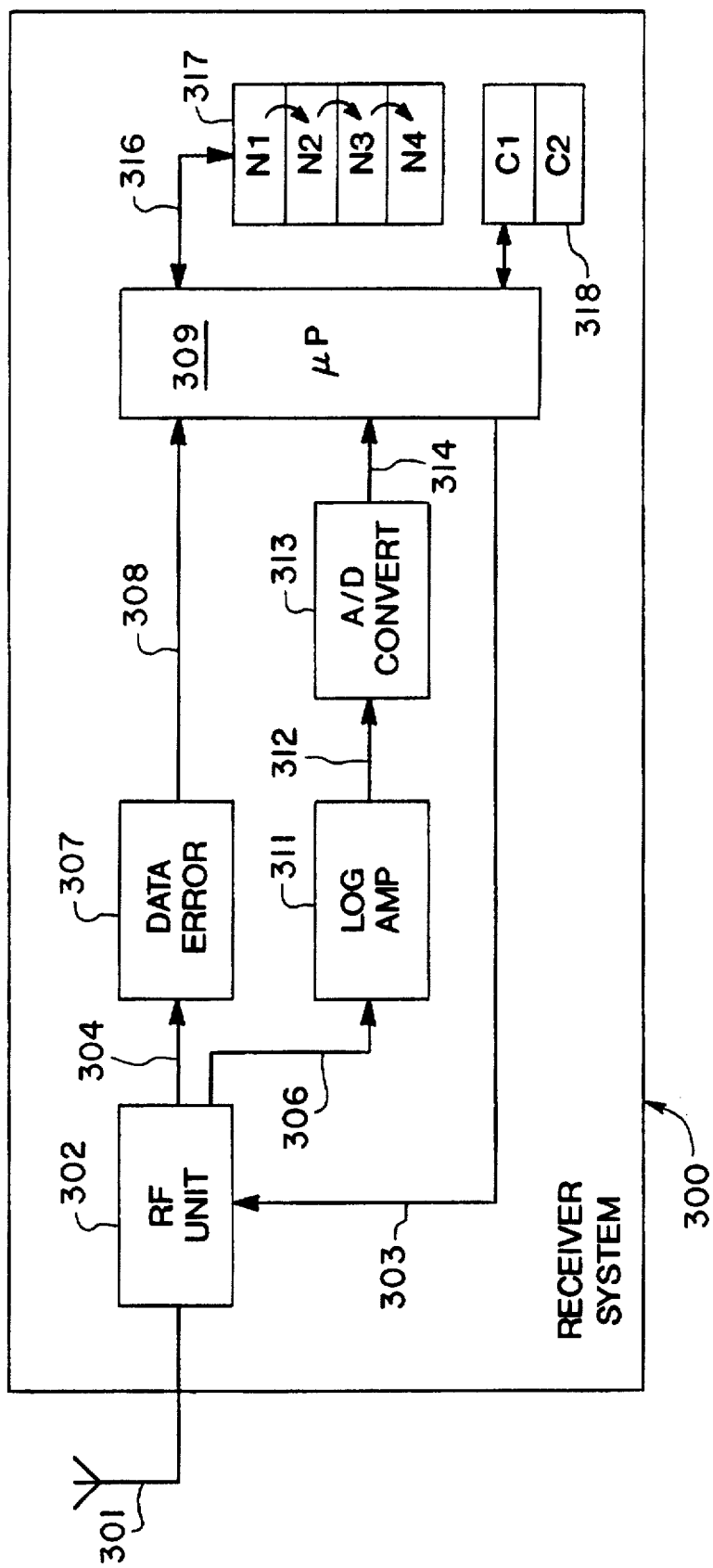
FIG. 3 shows in block diagram form a receiver system in accordance with the present invention.

FIG. 3 illustrates in block diagram form a receiver system incorporated in mobile phone 103 (shown in FIG. 2) in accordance with the present invention. It should be understood that mobile phone 103 includes many systems in addition to receiver system 300 shown in FIG. 3. Also, receiver system 300 is greatly simplified to aid understanding of the key features of the present invention. These additional systems and simplifications are well understood in the cellular phone field and their details are not important for a complete understanding of the present invention.

Receiver system 300 receives a radio frequency (RF) signal on antenna 301. As used herein, the term "radio frequency" includes microwave frequency signals. Other communication frequencies may also be used with straightforward modifications of the preferred system. In a preferred embodiment, the radio signal is a TDMA format or a TDD format communication. In a particular example, the system is a frequency hopping system which uses 10 millisecond frames, 4 full duplex time slots, 50 frequencies, and 1 frequency hop per frame. Each remote cell unit 102 (shown in FIG. 2) is at a different offset in hopping sequence from every other cell so that each RCU 102 can be identified by its relative position in the hopping sequence.

RF unit 302 is essentially a radio receiver which receives the RF signal from antenna 301 and provides a demodulated output signal. RF unit 302 receives a frequency synthesis control signal on line 303 which allows RF unit 302 to demodulate signals with a variety of carrier frequencies. This allows RF unit 302 to demodulate each of the frequencies or channels used by the cellular system individually. The details of RF unit 302 and frequency hopping TDMA transmission systems are well known and are not necessary for further understanding of the present invention.

A. Communication Quality Measurement

Communication quality is a measurement of a particular cell unit's ability to maintain a communication link with mobile phone 103. Communication quality measurement includes instantaneous signal strength measurement, averaged signal strength measurement, and bit error rate measurement. Other well known measurements which quantify the ability of a communication link to faithfully send and receive data may also be used.

RF unit 302 provides two measurement outputs 304 and 306 in accordance with the present invention. Line 304 provides a digital data signal, including the digitally encoded voice signal, is provided. On line 306, an analog signal representing relative signal strength is provided. These two signals are processed separately to provide a measurement of communication quality.

The digitally encoded signal is passed through data error circuit 307 which counts errors in the received data signal. A variety of data error detection circuits and protocols are well known and any may be used in data error circuit 307 in accordance with the present invention. Data error circuit 307 may also correct certain correctable errors and provide a corrected data signal to digital signal processing circuitry (not shown) which is used to process the digital voice data. For purposes of the present invention, data error circuit 307 provides an output on line 308 to microprocessor 309 indicating a running count or time averaged count of data errors in the received data.

Logarithmic amplifier 311, which is a well known type of amplifier circuit, serves to condition the signal strength signal on line 306 to non-linear signal on line 312. As is well known, signal strength varies over several orders of magnitude in radio transmission systems, and to make decisions based on the signal strength, it is useful, although not necessary, to compress the signal strength to a logarithmic scale which varies over one or two orders of magnitude or preferably less. The amplified signal on line 312 is converted to a digital signal by analog-to-digital converter 313 and provided on line 314 to microprocessor 309.

It should be understood that the various components in FIG. 3 may be integrated or otherwise provided on single circuits with great flexibility. For example, analog-to-digital converter 313 may be integrated in microprocessor 309 and logarithmic amplifier 311 may be integrated in RF unit 302. Other integration schemes are well known, and a user should integrate these functions to provide the most cost effective circuitry.

B. Neighbors Register

An important feature of the present invention is "neighbors register" 317. Neighbors register 317 is used to store identifications of a set of cell units 102 which have recently supported a communication link with mobile phone 103. It should be understood that the cell units identified in neighbors register 317 are not necessarily adjacent to mobile phone 103 or to the cell which is currently supporting the communication link with mobile phone 103 as the word "neighbors" might otherwise imply. Instead, the term neighbors is chosen simply to mean cell units 102 which have recently supported a communication link with mobile phone 103. The method by which the set of cell units 102 that are identified in the neighbors register are selected is described in greater detail hereinafter.

Neighbors register 317 is essentially an addressable data register (i.e., random access memory) which in a preferred embodiment has four addresses: N1, N2, N3 and N4. The neighbors register 317 is updated by inserting data on line 316 into address N1. When this occurs, the data originally in address N1 moves to address N2, the data originally in N2 moves to N3, and the data in N3 moves to N4 as suggested by the arrows in FIG. 3. The data in address N4 is discarded.

It should be understood that neighbors register 317 can be of any size, although in a preferred embodiment it includes four addresses. In any particular system, some fixed number of bits will be required to identify each cell unit 102. For example, in the frequency hopping system of the particular example, the cell identification can be made by a fixed number of bits used to describe the offset in the hopping sequence of a particular cell unit 102. Each address in neighbors register 317 must be wide enough (i.e., have enough bits) to store this information.

C. Candidates Register

Another important feature of receiver system 300 in accordance with the present invention is candidates register 318. Candidates register 318 serves to store identifications for a set of cell units 102 that are candidates or targets for accepting the communication link should it become necessary to hand off. The method by which the set of cell units identified as candidates is described in greater detail hereinafter. Candidates register 318 is a random access memory having at least two addresses in the preferred embodiment. It should be understood that candidates register 318 can have any number of addresses, including a single address. In the particular example, candidates register 318 has two addresses, which has been found to provide ample performance.

In summary, the receiver system 300 in accordance with the present invention includes means for measuring communication quality, preferably including both a bit error rate measurement and a signal strength measurement. The signal strength measurement is digitally encoded. Both the signal strength and the bit error rate measurement data are provided to a microprocessor. The microprocessor has access to a neighbors list and a candidates list. The handoff decision is based on the bit error rate data, the signal strength data, the contents of the candidates register, and the contents of the neighbors register.

It should be understood that the various elements in FIG. 3 may be integrated in any convenient fashion. In particular, the analog-to-digital converter and bit error rate circuit may be incorporated into a microprocessor. Also, candidates register 318 and neighbors register 317 may be incorporated within microprocessor 309. Any grouping of components may be provided as an application specific integrated circuit.

3. Data Format

The present invention is applicable to any communications format which is continuously able to monitor several remote cell units 102 (shown in FIG. 2) while maintaining a conversation with one particular remote cell unit 102. This capability is implicit in the TDMA format but could be implemented in frequency division multiple access (FDMA) or other digital communication formats. In the preferred embodiment, a TDMA format is used. FIG. 4 illustrates some features of the TDMA format.

The communication is broken up into frames, one of which is shown in FIG. 4. Each frame has a plurality of time slots, such as time slots TS0-TS7 in FIG. 4. The frames are repeatedly delivered at a one hundred hertz rate in bursts. In a full duplex system, some of the time slots TS0-TS7 are dedicated to receiving data while other of the time slots are dedicated to transmitting data. In the example of FIG. 4, TS0 through TS3 are used for cell unit 102 transmission and mobile unit 103 reception. Time slots TS4 through TS7 are used for mobile unit 103 transmission and cell unit 102 reception. Not all of the time slots are used to maintain any given conversation. Typically, each communication link or conversation occupies one transmission slot and one receive slot (i.e., slots TS0 and TS4 in FIG. 4). Hence, eight time slots can support four full duplex communication links simultaneously.

The unused time slots are referred to a "idle" time slots. Since a particular conversation typically uses only one receive time slot, there will be several unused receive time slots. It should be understood that the term idle means only that the particular mobile phone 103 involved in the handoff decision is not using the idle slot. The idle slot often will be occupied by communication link between another mobile phone 103 and the cell unit 102. Even if not occupied by another communication link, cell unit 102 transmits an "idle pattern" during in the time slots TS0 through TS3 when not in use.

In the preferred system, a total of 50 frequencies are used by the cellular system to carry on conversations. It should be understood that any number of frequencies may be used depending on the available bandwidth for the system. Fifty frequencies is merely an example. In accordance with the present invention, receiver system 300 measures the signal strength of all possible frequencies or channels during the idle receive time slots. The purpose of this measurement is to identify the best candidate cell units (i.e., having the highest signal strength) from all possible cell units 102. The particular method chosen will vary depending on the type of transmission system used (i.e., TDMA, CDMA, etc.) but for any system it is possible to devise a simple way to identify the best candidate cell units.

This is accomplished by selecting one of the idle receive time slots, for example, one of TS0, TS1, or TS3 in FIG. 4, when the mobile is receiving a conversation in time slot 2. The signal strength is measured on every tenth frequency in the hopping sequence during this idle time slot. This will measure five total frequencies each frame. This is performed for ten consecutive frames (i.e., ten repetitions of time slots 0–7) so that each of the 50 frequencies have been measured individually.

In the preferred embodiment the signal strength measurement is based on instantaneous power received at the given frequency. Alternatively, the signal strength on each frequency can be averaged over time to help compensate for spurious signal strength variation caused by fading, shadow regions, and the like. However, averaging signal strength over time will obviously require additional time for the signal strength measurement, and may delay handoff. The choice between instantaneous power measurement and average power measurement is made with these considerations in mind as well as the overall performance requirements for the cellular system.

Any number or configuration of time slots could be provided. It should be understood that the data within each time slot may be formatted in any convenient manner to convey communication, signal and control data between the mobile phone 103 and cell unit 102. It is to be expressly understood that the data formatting features of the present invention are not to be limitations on the present invention and are only provided as a particular example.

Also, it is to be expressly understood that a frame may be configured with any number of time slots. Each time slot can have any number of bytes, and can be suitably formatted with any arrangement of digital data necessary for a particular application. The present invention, therefore, is not to be limited to the data format shown in FIG. 4. The drawings herein are for a preferred system embodiment and serve to illustrate the operation of the present invention.

4. Operation of the Present Invention

Figure 5A:
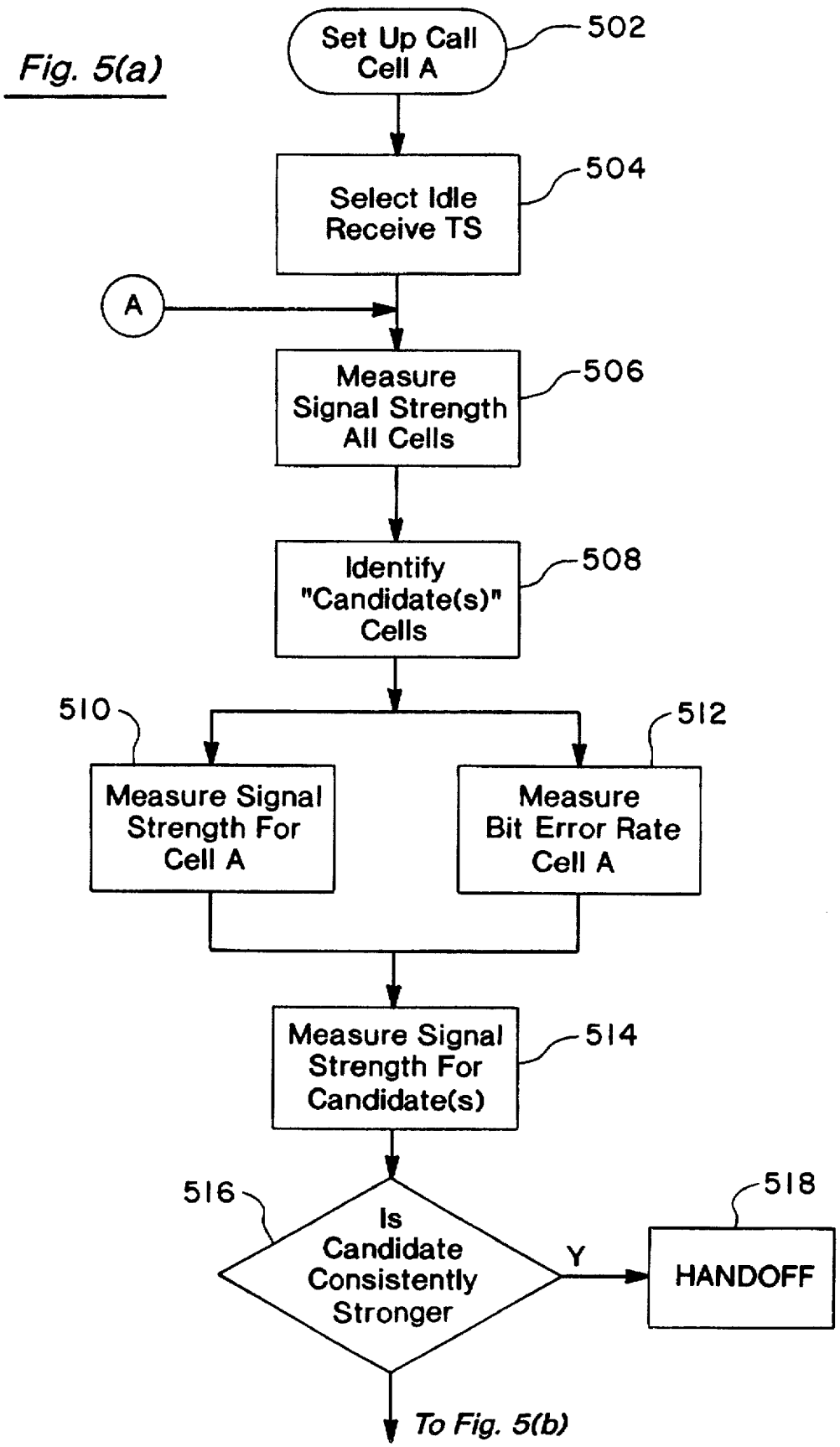
FIG. 5($a$) and FIG. 5($b$) together show a flow diagram of the handoff method in accordance with the present invention.

The flow diagrams in FIG. 5(a), FIG. 5(b) and FIG. 6 illustrate operation of the handoff method in accordance with the present invention. The functions set out in FIG. 5(a), FIG. 5(b) and FIG. 6 are easily implemented in a programmable microprocessor, such as microprocessor 309 in FIG. 3, or in similar circuitry. The steps of the present invention are preferably executed in the order presented, but unless specifically stated herein, the steps may be performed in any order. Likewise, at any point in the execution, a subroutine to perform other functions may be entered and execution of the remaining steps of the present invention delayed until such subroutine is completed. It is to be expressly understood that these expedients and design variations are within the scope of the present invention.

In step 502, a call between a first cell, identified as Cell A in FIG. 5(a) is established using conventional procedures. The call set up will likely involve many steps similar to a handoff routine in accordance with the present invention, but the focus is on identifying any RCU 103 in the system which can support a conversation immediately rather than finding the best RCU 103 to maintain the conversation. In other words, by having a good handoff method, the importance of selecting the best cell during the call setup step 502 is lessened because once the conversation is under way, the optimum RCU 102 can be identified and a handoff quickly made before the conversation progresses far.

A. Measurement of Communication Link Quality

Once the call is set up, at least one idle receive time slot is selected. The system must be designed so that the selected idle receive time slot is filled by transmissions from the other RCU's. Either the RCU's must continuously broadcast, even when not in use, on this time slot or other similar system arrangements must be provided. This arrangement is not uncommon in cellular system design.

In accordance with the method of the present invention, the signal strength of all possible cells is measured. This is performed in step 506 by measuring the signal strength at each of the available frequencies as described hereinbefore. Of course, not all of the cells in the system will have measurable signal strength. In the preferred embodiment, instantaneous signal strength is measured to reduce the time required to perform step 506. The instantaneous signal strength measurements are used to identify candidate cells in step 508. At least one candidate cell is identified, and two candidate cells are identified in the preferred embodiment. Any number of candidate cells may be selected, however, and their identification stored in candidate register 318 shown in FIG. 3.

During the conversation, microprocessor 309 (shown in FIG. 3) continuously measures signal strength for the cell servicing the ongoing conversation. Steps 510 and 512 are performed simultaneously during the ongoing conversation. The signal strength measurement for cell A and the measured bit error rate for cell A are performed by microprocessor 309 on the active time slot, as opposed to one of the idle time slots. These measurements are stored temporarily in memory or registers of microprocessor 309.

Preferably, the signal strength measurement in step 510 is averaged over 500 milliseconds or 50 complete frames. This averaging helps account for short variations in the signal strength caused by fading. During the same frames, the signal strengths of the two candidate cells are measured every ten milliseconds. Preferably, the signal strength measurement for the candidates performed in step 514 is also averaged over 500 milliseconds or 50 frames.

It should be understood that the averaging process can be ongoing or instantaneous values can be measured, stored, and later computed as an average or otherwise statistically combined. Any method for generating a statistically relevant figure representing signal strength may be used. The result is a contemporaneous average signal strength and error rate for the current cell and average signal strength for the candidate cells.

In a preferred implementation, if the conversation with cell A cannot be maintained due to exceptionally low signal strength, the averaging processes in steps 510, 512 and 514 can be terminated at any point after the signal strength measurement has begun rather than waiting the entire 500 milliseconds. This allows a rapid handoff decision when the conversation cannot be maintained. Otherwise, the averaging process is continued until a desired accuracy is achieved.

In step 516, the method determines if one of the candidate cells is both 1) consistently stronger than the current cell and 2) consistently provides a signal strength greater than a predetermined minimum value. For example, since the processes in FIG. 5(a) and FIG. 5(b) will be repeated many times during the conversation, the decision in step 516 is based upon whether the candidate cell is stronger for one or more consecutive passes through the steps in FIG. 5(a) and 5(b). In a preferred embodiment the minimum signal strength value of the candidate cell unit to allow handoff in step 516 is selected so that it is near the receiver overload point. This allows a handoff before errors occur due to overload of the receiver. This condition only occurs when cells are spaced very close to each other.

Step 516 greatly improves robustness and performance of the cellular system of the present invention by beginning the handoff processes in step 518 when the candidate cell is clearly a better choice than the current cell. Handoff step 518 includes process steps for updating the neighbors list (described in reference to FIG. 6) as well as executing routine handoff instructions between the mobile phone, remote cell units, and the master control unit (shown in FIG. 2).

B. Selection of Handoff Threshold

In most instances, the candidate will not be consistently stronger for consecutive passes and the method will flow to step 520 shown in FIG. 5(b). In steps 520 through 532 a "handoff threshold" value is selected. The handoff threshold is a value which quantifies the amount of improvement that the candidate cell must offer over the current cell unit in order to allow a handoff of the communication link from the current cell to the candidate cell. Preferably, the improvement is measured by comparing the signal strength of the candidate cell unit to the signal strength of the current cell unit. The units of measure of the handoff threshold values A–D are in decibels (dB).

Each of the candidate cell units is assigned one of the several handoff threshold values A–D through the branching operations 520, 522, and 524. This provides a dynamic assignment of handoff threshold value to each candidate cell which makes it more difficult (i.e., requires a higher improvement in signal strength) to handoff in some circumstances, while making it easier to handoff in other circumstances.

The handoff threshold values may be based upon a signal strength difference in decibels or upon a percentage difference between the signal strengths, or some other criteria useful for comparing the signal strength of the candidate cell with the current cell. It should be understood that the absolute values for the threshold values A–D may be determined empirically for a given system.

In step 520, a decision branch is made based upon the bit error rate measurement made in step 512. If the error rate is above a predetermined threshold, control passes to step 524, while if the error rate is zero or below a predetermined maximum bit error rate, the flow passes to step 522. This predetermined maximum bit error rate can be set to any value empirically determined to provide adequate system performance.

In step 522, it is determined if the candidate cell is also included on the neighbor list. In step 526, the candidate is not on the neighbor list and so it is unlikely that a ping-pong situation exists. However, in step 528 the candidate is on the neighbor list and so a potential ping-pong situation does exists. Thus, the handoff threshold value B selected in step 528 should be greater than the handoff threshold value A selected in step 526. In a particular example, the handoff threshold A is 20% improvement while the handoff threshold B is 33% improvement.

Referring now to the right-hand side of the flow chart in FIG. 5(b), when errors do exist in the current cell, the method of the present invention also determines if the candidate is on the neighbor list. The determination in step 524 is for the same reason as the determination in step 522, that is, if a candidate is on a neighbor list, a ping-pong situation is likely and the handoff decision should be made more difficult or delayed until the candidate cell offers a very significant improvement in signal strength. However, when errors exist in the current cell, the method of the present invention is more flexible in allowing handoff to occur to maximize audio quality of the ongoing conversation.

In step 530, if the candidate is not on the neighbor list, and ping-pong is unlikely, the handoff threshold value C is selected. In this situation, handoff should probably occur, and so handoff threshold C should be quite low or zero. In step 532, errors exist, but a possibility of ping-ponging is present so handoff threshold D is selected which is greater than handoff threshold C. For example, handoff threshold D can be set to 10% improvement while handoff threshold C is 0%. In the preferred embodiment, threshold value C<threshold value D<threshold value A<threshold value B.

In each case, once the handoff value is selected, the method of the present invention determines if the candidate signal strength measured in step 514 is sufficiently improved over the signal strength of Cell A to surpass the selected threshold value. Once the comparison is made, either a handoff is directed in step 536 or the method is repeated by returning to step 506. Again, the handoff step 536 includes both updating the neighbors list and executing the predefined handoff instructions which are proper for the particular cellular system involved.

FIG. 6 illustrates a flow diagram of a portion of the method of the present invention responsible for updating and maintaining the neighbors list. The steps illustrated in FIG. 6 occur at the beginning of the handoff steps 518 and 536 shown in FIG. 5. Once the handoff instruction is received in step 602 (i.e., from step 516 or step 534, for example), the method determines if the candidate cell is in the neighbors list. If the candidate cell is in the neighbors list, it must be deleted from the list in step 606.

Referring to the illustration of neighbors register 317 in FIG. 3, this is performed simply by deleting the contents of whichever address contained the candidate cell address and compacting the other address so that the address N1 is empty. If the candidate cell is not in the neighbors list or once the candidate cell is deleted from the neighbors list in step 606, the prior cell identification is inserted into the first address in neighbors register 317 in step 608.

Thus, neighbors register 317 will contain the most recent cell which was used in address N1. Address N2 will have the next most recent and address N3 will have the identification of the cell used before that. In this manner, register 317 maintains a time ordered history of all of the cells with which receiver system 300 has been in contact. Once the neighbors list is updated in step 608, the handoff instructions appropriate for the system are executed in step 610.

Is should be appreciated that a method and apparatus for rapid and accurate handoff in a digital cellular phone system has been provided. It is to be expressly understood that the claimed invention is not to be limited to the description of the preferred embodiment or specific examples but encompasses all modifications and alterations within the scope and spirit of the inventive concept.

We claim:

1. In a cellular phone system having a plurality of cell units, a method for handing off a communication link with a mobile phone from a first cell unit to a second cell unit, the method comprising the steps of:

creating a neighbors list comprising cell units that have recently supported a communication link with the mobile phone;

creating a candidates list comprising cell units which are capable of supporting a communication link with the mobile phone;

measuring a first signal strength between the first cell unit and the mobile phone;

measuring bit error rate between the first cell unit and the mobile phone;

measuring a second signal strength between each of the cell units on the candidates list and the mobile phone;

determining a handoff threshold value for each of the cell units on the candidates list based upon contents of the candidates list, contents neighbors list, and the bit error rate measurement;

determining a signal strength improvement between the first signal strength and each second signal strength;

in the event that none of the cell units on the candidates list has a signal strength improvement greater than the handoff threshold associated with that cell unit, returning to the step of creating a candidates list without generating a handoff command;

in the event that one of the cell units on the candidates list has a signal strength difference greater than the handoff threshold associated with that cell unit:

identifying that cell unit as the second cell unit;

generating a handoff command to handoff the communication link from the first cell unit to the second cell unit;

removing the second cell unit from the candidates list;

removing the second cell unit from the neighbors list; and placing the first cell unit in the neighbors list.

2. The method of claim 1 wherein the cellular phone system uses a number of communication channels and each of the cell units which can support a communication link with the mobile phone can be identified by the communication channels it is using at any instant in time, the step of creating a candidates list further comprising the steps of:

measuring signal strength at the mobile phone on each of the number of communication channels;

selecting a subset of the number of communication channels having the highest measured signal strength;

associating a cell unit identifier with each of the communication channels in the subset; and storing the cell unit identifiers as the candidates list.

3. The method of claim 2 wherein the step of measuring signal strength on each of the number of communication channels consists of measuring instantaneous signal strength.

4. The method of claim 2 wherein the step of measuring signal strength on each of the number of communication channels comprises measuring average signal strength over a period of time.

5. The method of claim 1 wherein the step of creating a neighbors list comprises storing a cell unit identifier for a particular cell unit in the neighbors list each time the communication link is handed off from that particular cell unit.

6. The method of claim 1 wherein the step of creating a neighbors list comprises creating a list of at least four cell units which have recently supported a communication link with the mobile phone.

7. The method of claim 1 wherein the steps of creating the candidates list and creating the neighbors list are performed by circuitry in the mobile phone.

8. A mobile phone for communicating with cell units in a cellular phone system having a number of communication channels for providing a digital communication link between the mobile phone and the cell units, the mobile phone comprising:

means for transmitting and receiving on the number of communication channels;

adjustable means coupled to the means for transmitting and receiving for demodulating each of the communication channels individually and providing a demodulated signal;

first means for measuring instantaneous signal strength of the demodulated signal second means for measuring data error rate of the demodulated signal;

candidate register means for storing identities of cell units having sufficient instantaneous signal strength to support the communication link with the mobile phone;

neighbor register means for storing identities of cell units which have recently supported the communication link with the mobile phone; and control means coupled to receive data from the first and second means for measuring, to provide cell unit identities to the candidate register and neighbors register, and to provide a control signal to the adjustable means, wherein the control means is programmed to:

a) adjust the adjustable means to receive each of the communication channels;

b) select cell units for storage in the candidate register based upon the data received from the first means for measuring;

c) generate a handoff command based on the contents of the candidates register, contents of the neighbors register, and the data received from the first and second means for measuring; and d) add the cell identity of the cell from which the communication link was handed off to the neighbors list.

* * * * *